(12) United States Patent
Gaddam et al.

(10) Patent No.: US 8,503,978 B2
(45) Date of Patent: Aug. 6, 2013

(54) REAL TIME DATA USAGE METERING ON A MOBILE STATION AND RECONCILIATION WITH BILLABLE USAGE MEASURED BY A MOBILE NETWORK

(75) Inventors: Venkat Gaddam, Bridgewater, NJ (US); Mohammad Raheel Khalid, Raritan, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 60 days.

(21) Appl. No.: 13/316,132

(22) Filed: Dec. 9, 2011

(65) Prior Publication Data
US 2013/0149994 A1    Jun. 13, 2013

(51) Int. Cl.
*H04M 11/00*    (2006.01)
(52) U.S. Cl.
USPC ............ 455/406; 455/405; 455/466; 370/253
(58) Field of Classification Search
USPC ..... 455/405–408, 412.1–412.2, 414.1–414.2, 455/466; 370/252–253
See application file for complete search history.

(56) References Cited

U.S. PATENT DOCUMENTS

| | | | |
|---|---|---|---|
| 8,340,633 B1* | 12/2012 | Rege et al. | 455/406 |
| 2010/0175103 A1* | 7/2010 | Walter et al. | 726/1 |
| 2011/0275344 A1* | 11/2011 | Momtahan et al. | 455/405 |
| 2012/0101952 A1* | 4/2012 | Raleigh et al. | 705/304 |
| 2012/0129490 A1* | 5/2012 | Sharma et al. | 455/406 |
| 2012/0163232 A1* | 6/2012 | Yoo | 370/253 |
| 2012/0276867 A1* | 11/2012 | McNamee et al. | 455/406 |

* cited by examiner

*Primary Examiner* — Kashif Siddiqui

(57) ABSTRACT

A data meter client on a mobile station meters data usage by one or more applications and communicates with a network element to reconcile the metered data usage with the current data usage as measured in the network. The client determines whether the metered data usage may be out-of-sync. When it is determined that the locally metered amount may be out-of-sync, the client sends to the network element a query requesting an estimate data current usage, as measured in the network, receives a response containing the current estimate data usage, and reconciles data usage information in its local database. The client updates information displayed in a graphical user interface for a user of the mobile station. The network element can send a notification to the mobile station containing the current data usage so that the client can update and display the current data usage measured in the network.

17 Claims, 8 Drawing Sheets

REAL TIME DATA USAGE METERING ON A MOBILE STATION AND RECONCILIATION WITH BILLABLE USAGE MEASURED BY A MOBILE NETWORK

BACKGROUND

In recent years, mobile communication services have expanded and increased in popularity, around the world. Many advanced networks offer wireless mobile communication service for voice calls, mobile messaging services (e.g. text and/or multimedia) and data communications. The data services, for example, enable surfing the world wide web via a browser on mobile stations, or receiving multimedia services on the mobile stations.

Often, a user of a mobile station may want to find out a current estimate amount of data usage by the mobile station for various reasons, including the user's concerns for billing purposes. Data is transmitted or received on the mobile station via various logical network interfaces of the mobile station, which allow for an application to transmit and receive packets of data through a socket connection. A socket is one endpoint of a two-way communication link between programs running on two devices over a mobile communication network (e.g., a mobile station and a server on a network). At any given time, there can be several different applications accessing various network interfaces of the mobile stations, creating data traffic between two connected devices. Thus, to determine an amount of data being received from a network element over the mobile communication network, the mobile station monitors the amount of data being received or transmitted via network interfaces and logs information into a special file that is stored in the mobile station.

For example, FIG. 1 shows an existing technique for monitoring data usage by a mobile station running on a Linux operating system. As shown in FIG. 1, an application of the mobile station receives and transmits data by reading from and writing to a socket connection via a network interface of the mobile station, and the mobile station keeps information relating to an amount of data received (e.g., cumulative totals of data received) from the network element by writing the information into a special file of the Linux operating system. That is, the special file contains a list of network interface names used and information relating to current cumulative data usage by the mobile station on a per network interface basis. The existing technique for monitoring data usage retrieves the current cumulative data usage from the special file for processing and presenting the data usage information to the user of the mobile station.

However, this existing technique has limitations and shortcomings. For example, when failures in network or transmission protocols result in retransmission of data, the existing technique for monitoring data usage does not take into account such non-billed data, retransmissions on the network, redundantly counted data, and resets to the cumulative file. Thus, the existing technique tends to provide inaccurate information on real-time (or near actual, billable) data usage by mobile stations and lead to adverse effects for users of the mobile stations.

Hence, further improvement is still possible in a technique for real-time data usage monitoring (or metering) on a mobile station and reconciliation with billable data usage measured by a network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
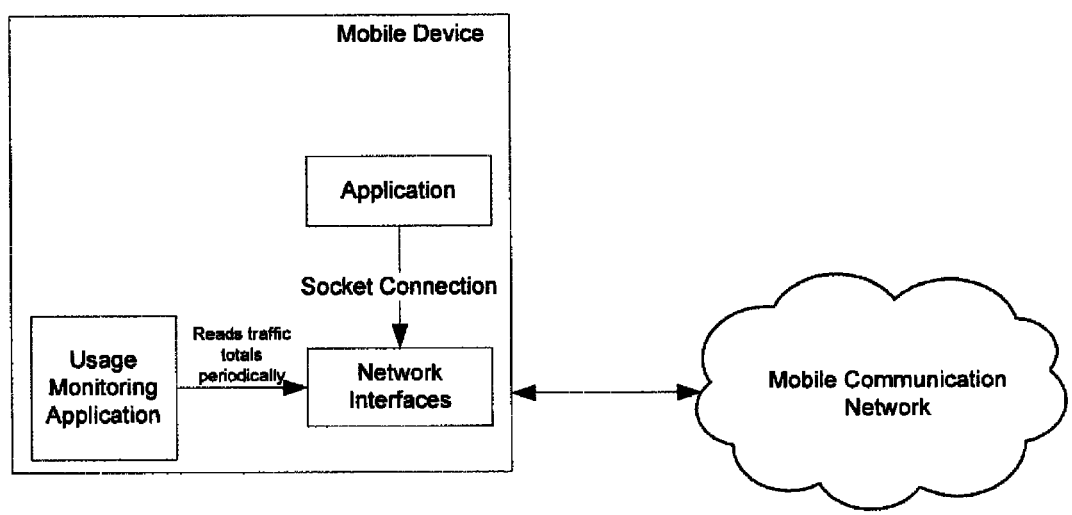
FIG. 1 shows an existing technique for monitoring data usage on a mobile station running on a Linux operating system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the existing techniques, since the data usage information is collected and measured only at the mobile station without any means to synchronize with data usage by the mobile station as measured in the network, inaccurate data usage information can be presented to a user of a mobile station due to failures in network, transmission protocols, device failures, etc. The exemplary techniques disclosed herein provide, however, in various combinations, real-time, billable data usage to the user of the mobile station, based on the data usage by the mobile station as measured in the network, accounting for various network, transmission protocols, or device failures.

The examples discussed herein obtain and update current usage of data communication service over a mobile communication network by a mobile station from a real-time reporting platform on the mobile communication network and present to a user of the mobile station a real-time current estimate of data usage. That is, the exemplary techniques provide the user of the mobile station with real-time data usage information on the mobile station and reconcile with billable data usage presented to the user of the mobile station, as measured in the network. In the description herein, "real-time" is used to mean "near actual" or "billable;" and "real-time data usage" is used to mean "current usage of data communication service by a mobile station as measured in a network."

An exemplary method meters real-time data usage on a mobile station. A prior amount of usage of data communication service through the mobile communication network by the mobile station is obtained by the mobile station via communication through the mobile communication network to a real-time reporting platform on the mobile communication network. On the mobile station, subsequent usage of the data communication service through one or more network interfaces of the mobile station is monitored and a monitored amount of the subsequent usage of the data communication service by one or more applications running in the mobile station is determined. To obtain an estimate of current total usage of the data communication service through the mobile communication network, the monitored amount of the subsequent usage of the data communication service is added to the prior amount of usage of the data communication service.

The mobile station also monitors to determine whether or not the estimate of current total usage of the data communication service through the mobile communication network is out-of-sync. When it is determined that the estimate of current total usage of the data communication service through the mobile communication network is not out-of-sync, an indication of usage of the data communication service, based on the estimate of current total usage, is presented to the user of the mobile station. When it is determined that the estimate of current total usage of the data communication service through the mobile communication network is out-of-sync, the mobile station communicates through the mobile communication network to obtain information indicating a current estimate amount of usage of the data communication service through the mobile communication network by the mobile station from a real-time reporting platform. The real-time reporting platform on the mobile communication network provides the current estimate amount of usage of the data communication service by the mobile station, as measured in the network. Based on the information obtained from the real-time reporting platform, the estimate of the current total usage of the data communication service is reconciled. Also, based on the reconciled estimate of current total estimate of usage of the data communication service, an indication of the real-time usage of the data communication service by the mobile station is made to the user of the mobile station.

An exemplary data meter client executable by a processor of a mobile station is provided in a non-transitory medium bearing the exemplary data meter client. Execution of the exemplary data meter client by the processor configures the mobile station to perform various real-time data usage metering functions. The real-time data usage metering functions enable the mobile station to communicate through a mobile communication network to obtain information indicating a prior amount of usage of data communication service through the mobile communication network by the mobile station, from a real-time reporting platform on the mobile communication network. The mobile station also monitors through the real-time data usage metering functions subsequent usage of the data communication service through one or more network interfaces of the mobile station to determine a monitored amount of the subsequent usage through the mobile communication network by one or more applications running on the mobile station. To obtain an estimate of current total usage of data communication service through the mobile communication network, the monitored amount of the subsequent usage is added to the prior amount of usage of the data communication service. The mobile station, via the real-time data usage metering functions, presents an indication of real-time usage of the data communication service to the user of the mobile station, based on the estimate of current total usage.

The mobile station also determines whether or not the estimate of current total usage of the data communication service through the mobile communication network is out-of-sync. When it is determined that the estimate of current total usage of the data communication service through the mobile communication network is out-of-sync, the mobile station communicates, via the real-time data usage metering functions, through the mobile communication network to obtain information indicating a current estimate amount of usage of data communication service through the mobile communication network by the mobile station, from the real-time reporting platform on the mobile communication network. The mobile station reconciles the estimate of current total usage based on the received information indicating the current estimate amount of usage of data communication service through the mobile communication network by the mobile station, and presents an indication of the real-time usage of the data communication service, based on the reconciled estimate of the current total usage, to the user of the mobile station.

An exemplary system for updating real-time data usage on the mobile station is provided. The exemplary system includes a real-time reporting platform configured to provide usage of data communication service through a mobile communication network by the mobile station, and a middleware server configured to communicate with the real-time reporting platform.

Execution of a program by a processor of the real-time reporting platform configures the real-time reporting platform to perform various functions. The real-time reporting platform receives a request from the middleware server for information about a current estimate amount of usage of data communication service through the mobile communication network by the mobile station. Responsive to the request, the real-time reporting platform sends to the middleware server the requested information about the current estimate amount of the usage of data communication service by the mobile station. The real-time reporting platform detects occurrence of a predetermined event related to the usage of data communication service through the mobile communication network by the mobile station; and sends a data usage notification over the mobile communication network to the mobile station indicating that the estimate usage of data communication service by the mobile station has reached a threshold level.

Execution of a program by a processor of the middleware server configures the middleware server to perform various functions. The middleware server receives a data usage request from the mobile station, over the mobile communication network, requesting a current estimate amount of usage of data communication service through the mobile communication network by the mobile station. The middleware server, in response to the data usage request, sends to the mobile station, over the mobile communication network, a data usage response including the current estimate amount of usage of data communication service by the mobile station.

As a result, using the exemplary techniques disclosed herein, a mobile station can obtain current and accurate data usage of data communication service over the mobile communication network by the mobile station, as measured in the network, from a real-time reporting platform, and present the current and accurate data usage to a user of the mobile station.

Reference now is made in detail to the examples illustrated in the accompanying drawings and discussed below.

Figure 2:
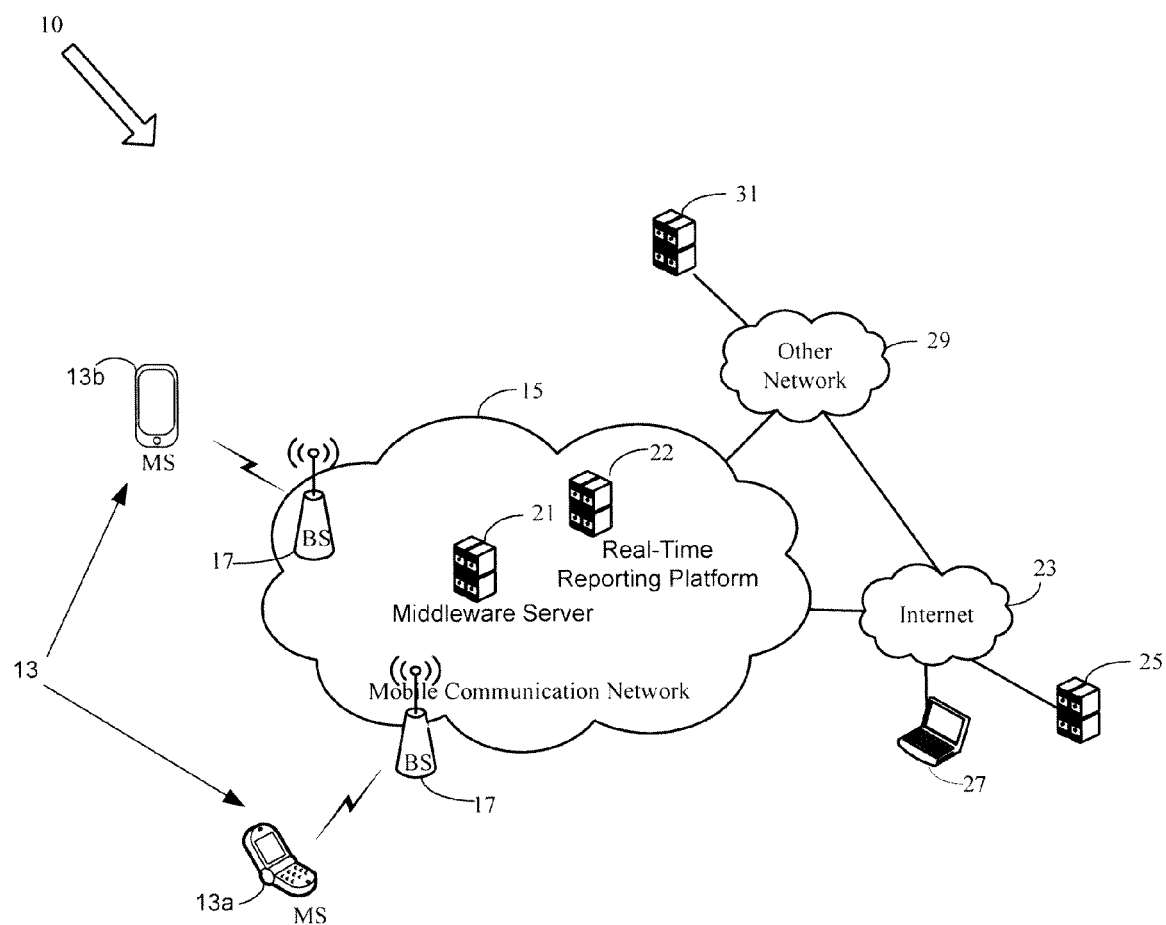
FIG. 2 is a high-level functional block diagram of an exemplary system of networks/devices that provide various communications for mobile stations and support updating a current estimate of data usage, as measured in a network, on a mobile station.

FIG. 2 illustrates a system 10 offering a variety of mobile communication services, including communications for data services by users of mobile stations 13 (13a or 13b). The example shows simply two mobile stations (MSs) 13a and 13b as well as a mobile communication network 15. The mobile stations 13a and 13b are examples of mobile stations that may be used for data services, such as receiving usage of data communication service by the mobile stations. However, the network will provide similar communications for many other similar users as well as for mobile stations/users that do not participate in the data services. The network 15 provides mobile wireless communications services to those mobile stations 13a and 13b as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion herein.

The wireless mobile communication network 15 might be implemented as a network conforming to the code division multiple access (CDMA) IS-95 standard, the 3rd Generation Partnership Project 2 (3GPP2) or the Evolution Data Optimized (EVDO) standard, the Global System for Mobile (GSM) communication standard, a time division multiple access (TDMA) standard, Long Term Evolution (LTE) standard, other standards or their variants used for public mobile wireless communications. The mobile stations 13a and 13b may be capable of voice telephone communications through the network 15; and for the data communication services, the exemplary devices 13a and 13b are capable of data communications through the particular type of network 15 (and the users thereof typically will have subscribed to data services through the network).

The network 15 allows users of the mobile stations such as 13a and 13b (and other mobile stations not shown) to initiate and receive telephone calls to each other as well as through the public switched telephone network (PSTN) and telephone stations connected to the PSTN. The network 15 typically offers a variety of data services via the Internet 23, such as downloads, web browsing, email, etc. By way of example, the drawing shows a laptop personal computer (PC) type user terminal 27, a server 25 connected to the Internet 23; and the data services for the mobile stations 13a and 13b via the Internet 23 may be with devices like those shown at 25 and 27 as well as with a variety of other types of devices or systems capable of data communications through various interconnected networks. The mobile stations 13a and 13b of users of the data communications service also can receive and execute applications written in various programming languages, as discussed more later.

Mobile stations 13a and 13b can take the form of portable handsets, e-book readers, tablet computers, smart-phones or personal digital assistants, although they may be implemented in other form factors. Program applications, including an application to assist in the data communication service can be configured to execute on many different types of mobile stations 13a and 13b. For example, a mobile application can be written to execute in an iOS or Android operating system, or on a binary runtime environment for a BREW-based mobile station, a Windows Mobile based mobile station, Java Mobile, or RIM based mobile station (such as a BlackBerry or the like), or the like. Some of these types of mobile stations can employ a multi-tasking operating system as well.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives radio frequency (RF) signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations 13 communicate. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network and the Internet) either directly or indirectly.

The carrier will also operate a number of systems that provide ancillary functions in support of the communications services and/or application services that the carrier offers through the network 10, and those elements communicate with other nodes or elements of the network 10 via one or more private Internet Protocol (IP) type packet data networks 29 (sometimes referred to as an Intranet), i.e., a private networks. Generally, such systems are part of or connected for communication via the private network 29. However, it is well known that systems outside of the private network could serve the same functions as well. Examples of such systems, in this case operated by the network service provider as part of the overall network 10, which communicate through the intranet type network 29, include one or more application servers 31, middleware servers 21, and real-time reporting platforms 22.

A mobile station 13 communicates over the air with a base station 17 and through the traffic network 15 for various voice and data communications, e.g., through the Internet 23 with a server 25 and/or with application servers 31. If the service carrier offers a real-time data usage service, the service may be hosted on a carrier operated application server 31, for communication via the networks 15 and 29. Here, the real-time data usage service is a data service providing users of mobile stations with current estimates of billable usage of the data communication service by the mobile stations, as measured in the network. Alternatively, the real-time data usage service may be provided by a separate entity (alone or through agreements with the carrier), in which case the service may be hosted on an application server such as server 25 connected for communication via the networks 15 and 23. Servers such as 25 and 31 may provide any of a variety of common applications or service functions in support of or in addition to an application program running on the mobile station 13. However, for purposes of further discussion, we will focus on functions thereof in support of the real-time data usage service. For a given service, including the real-time data usage service, an application program within the mobile station 13 may be considered as a 'client' and the programming at a computer platform 25 or computer platform 31 may be considered as the 'server' application for the particular service.

In the example, the mobile communication network 15 includes a middleware server 21 and real-time reporting platform 22 for providing real-time data usage information to mobile stations 13a and 13b. That is, the middleware server 21 and real-time reporting platform 22 are backend servers on the carrier's network 15 that support providing the real-time data usage service over the mobile communication network 15 to mobile stations 13a and 13b. The real-time reporting platform 22 is one or more servers that are capable of measuring and providing real-time, billable or accurate (or current) estimate amounts of data usage of data communication services by the mobile stations 13a and 13b as measured in the network. For example, the information provided by the real-time reporting platform 22 may be processed to generate calls and/or to deduct from prepaid balances.

Figure 3:
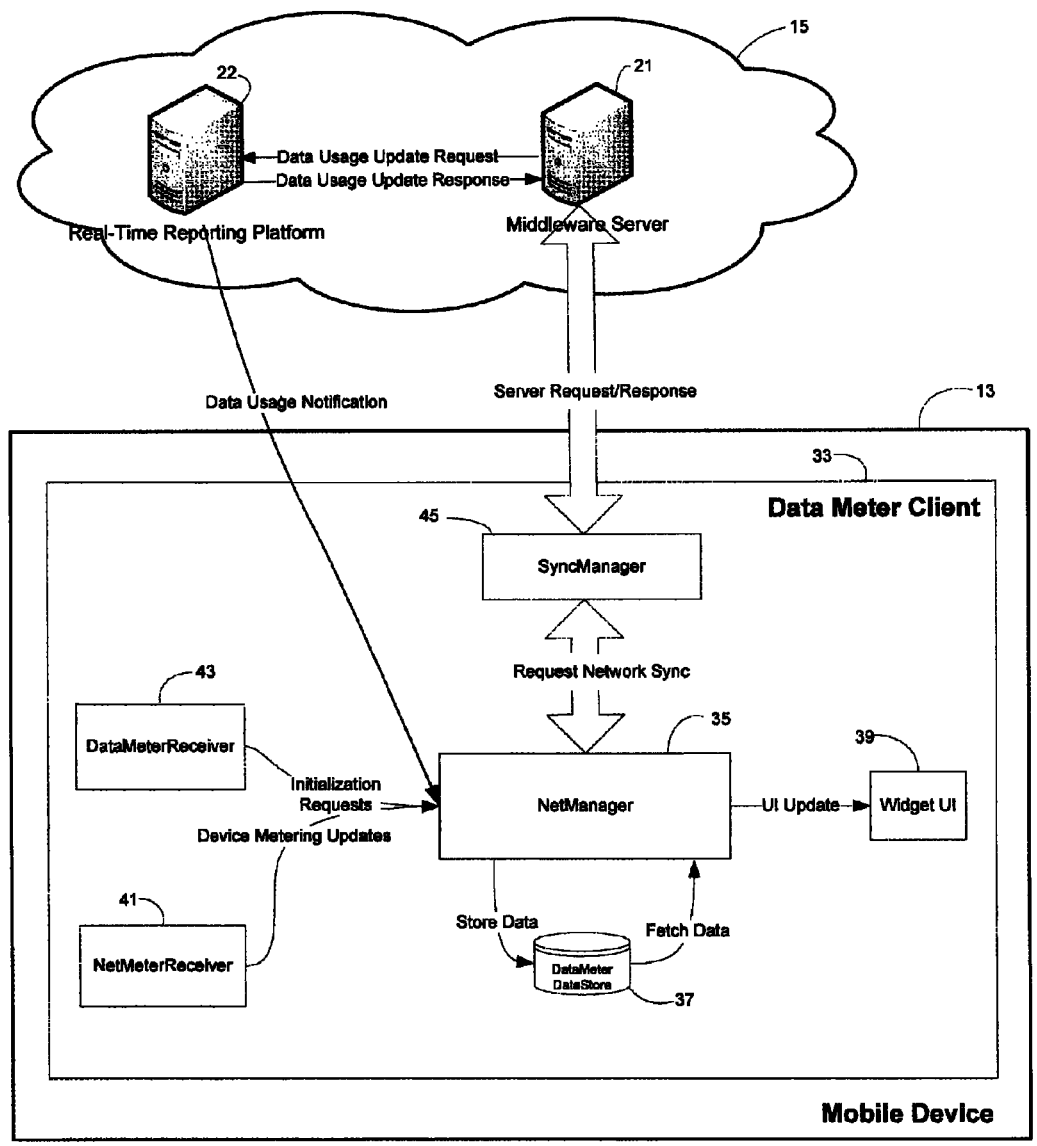
FIG. 3 is an architectural diagram for an exemplary system for updating real-time usage of data communication service over the mobile communication service by the mobile station, at a high level.

The middleware server 21 is one or more servers interfacing with mobile stations 13a and 13b, over the mobile communication network 15, to provide various customer care functions including providing information relating to real-time data usage by the mobile stations 13a and 13b, as measured in the network (or obtained from the real-time reporting platform 22), to the mobile stations 13a and 13b and/or mobile station users. The middleware server 21 obtains from the real-time reporting platform 22 a report of real-time, billable (or current estimate of) data usage by the mobile station 13, as measured in the network, by sending a data usage update request to and receiving a data usage update response from the real-time reporting platform 22. After receiving the requested information from the real-time reporting platform 22, the middleware server 21 sends the received information about data usage by the mobile station 13 over the mobile communication network 15 to a real-time data metering application running on the mobile station 13 (e.g., a data meter client 33 which is shown in FIG. 3) for updating real-time data usage information presented to the user of the mobile station 13. That is, the middleware server 21 communicates with the mobile station 13 on demand to provide current estimates of data usage by the mobile station 13, as measured in the network, to the mobile station 13. Thus, the middleware server 21 acts as a point of contact for the mobile station 13 for obtaining billing or accounting accurate data usage information for the mobile station 13 from the network.

The real-time data usage information under consideration herein may be delivered to touch screen type mobile stations as well as to non-touch type mobile stations. Hence, our simple example shows the mobile station (MS) 13a as a non-touch type mobile station and shows the mobile station (MS) 13b as a touch screen type mobile station. Implementation of the real-time data usage service will involve at least some execution of programming in the mobile stations as well as implementation of user input/output functions and data communications through the network 15, from the mobile stations.

FIG. 3 illustrates a high level architectural diagram showing an exemplary system for providing information on real-time usage of data communication service ("real-time data metering") on a mobile station. At a conceptual level, the exemplary system shown in FIG. 3 includes a real-time reporting platform 22 and a middleware server 21 in the network 15 as well as a data meter client 33 running on the mobile station 13 in communication with the middleware server 21 over the mobile communication network 15.

As noted earlier, the middleware server 21 and real-time reporting platform 22 both are backend servers on the carrier's network 15 that support real-time data usage metering functions for mobile stations 13a and 13b. As such, the real-time reporting platform 22 is one or more servers that are capable of providing reports of real-time, billable or current data usage of data communication services by mobile stations. In response to a query from the middleware server 21 requesting current data usage by the mobile station 13, the real-time reporting platform 22 sends the requested information containing a current data usage amount of data communication services by the mobile station 13 to the middleware server 21.

Also, when triggered by data usage on the network (e.g., data usage by the mobile station 13) the real-time reporting platform 22 can send a data usage notification containing a current estimate of real-time data usage by the mobile station 13 to a real-time data metering application (e.g., the data meter client 33) running on the mobile station 13 using various communication methods. For example, the real-time reporting platform 22 can send such a data usage notification as a short messaging service (SMS), enhanced messaging service (EMS), or multimedia messaging service (MMS) message over the mobile communication network 15. Alternately, the real-time reporting platform 22 can send the data usage notification containing the current estimate of data usage by the mobile station 13 over a packet connection, such as a Transmission Control Protocol (TCP) or Internet Protocol (IP) connection, or the like, using push technology.

For example, using the push technology, the current estimate of data usage by the mobile station 13 as measured in the network can be pushed (or delivered) over a persistent TCP or IP connection to the mobile station 13 by the real-time reporting platform 22. The push technology delivers information to a mobile station only when new information becomes available, and the delivery of the information is initiated by a server, e.g., the real-time reporting platform 22, on the network. A packet connection is established between the mobile station 13 and a push engine (not shown). The real-time reporting platform 22 may be one of a number of applications servers communicating with the push engine to utilize the established connection through the network 15. With the established connection, information relating to the current estimate of data usage by the mobile station 13 is pushed by the real-time reporting platform 22 to the mobile station 13. The data communication between the mobile station 13 and the real-time reporting platform 22 is maintained or kept active to allow a push of data when needed, therefore the ongoing data session is sometimes called a "persistent connection." In this nomenclature, "connection" refers to a logical communication session through the network, not necessarily a physical or electrical connection.

As discussed earlier, the middleware server 21 is one or more servers interfacing with mobile stations 13a and 13b over the mobile communication network 15 for providing real-time current estimates of data usage by the mobile stations 13a and 13b, as measured by the network or obtained from the real-time reporting platform 22. The middleware server 21 communicates with and receives from the real-time reporting platform 22 the real-time, billable (or current estimate of) data usage by the mobile station 13, using update request/response messages (e.g., a data usage update request and a data usage update response to and from the real-time reporting platform 22). The middleware server 21 is also configured to receive a request from the mobile station 13 over the mobile communication network 15 and send to the mobile station 13 (e.g., the data meter client 33 for updates) a response containing the obtained current estimate of data usage by the mobile station 13 over the mobile communication network 15, as measured in the network by the real-time reporting platform 22.

For communication between the mobile station 13 and middleware server 21 (e.g., exchanging the request and response messages between the mobile station 13 and middleware server 21 over the mobile communication network 15), various methods including messages over a packet connection, SMS, EMS or MMS messages over the mobile communication network 15 can be utilized. Alternately, push technology using a persistent TCP connection can be used between the mobile station 13 and middleware server 21. When the persistent TCP connection is used, a request and/or response containing real-time data usage information can be pushed to the mobile station 13 or middleware server 21. Alternately, a general packet connection can be established and used between the mobile station 13 and middleware server 21 for exchanging the request and response messages over the mobile communication network 15.

The data meter client 33 running on a mobile station 13 provides a user of the mobile station 13 with a way to monitor the mobile station's billable current data usage by displaying the billable current data usage information via its widget user interface (UI) against the mobile station's billing cycle and data usage plan. The data meter client 33 is preinstalled or user installed application software on the mobile station 13 for updating real-time billable data usage information on the mobile station 13 via synchronization with the real-time reporting platform 22 on the network 15. Specifically, when the user of the mobile station 13 selects or launches the data meter client 33 (e.g., by clicking its widget UI) on the mobile station 13, the data meter client 33 performs various functions to obtain the real-time billable (or current estimate of) data usage by the mobile station 13 from the real-time reporting platform 22 via the middleware server 21 on the network 15. The data meter client 33 also can provide alerts or alarms to the user as the level of data usage approaches one or more thresholds for data usage, which are set by the user or carrier under the user's communications plan.

Having discussed the exemplary system at a high level, various components of the data meter client 33 running on the mobile station 13 are briefly described below. The data meter client 33 includes various components including NetManager 35, DataMeterDataStore 37, Widget UI 39, NetMeterReceiver 41, DataMeterReceiver 43, and SyncManager 45.

NetManager 35 is a component of the data meter client 33 for central management of various other components and data meter client functions, such as initializing and monitoring other components. NetManager 35 implements logic used to intelligently coordinate the monitoring, storing, synchronizing, and updating real-time data usage information displayed by Widget UI 39. When NetManager 35 receives an update of the real-time data usage by the mobile station 13 from the middleware server 21, NetManager 35 performs various functions including initializing NetManager 35 and DataMeterDataStore 37 (an internal database of the data meter 33), if not initialized. NetManager 35 validates inputs received from the middleware server 21 by checking data formats of the received inputs and updates data stored in various tables of data of DataMeterDataStore 37. NetManager 35 also updates data usage information displayed by Widget UI 39. In addition, NetManager 35 determines whether or not the data usage information on the mobile station 13 is out-of-sync with respect to data usage as measured in the network. If NetManager 35 detects that the data usage information on the mobile station 13 is out-of-sync, NetManager 35 starts a synchronization process with the network by sending a sync request message to the middleware server 15 to obtain real-time data usage updates from the real-time reporting platform 22 on the network. NetManager 35 further schedules and performs periodic (e.g., every 30 minutes) monitoring and updating the real-time data usage by the mobile station 13 when the mobile station 13 is not asleep.

DataMeterDataStore 37 is one or more local databases (e.g., SQLite database) for storing temporary data on network activity and deltas within the data meter client 33. The term "delta" is used herein to generally refer to changes in a particular piece of data. The database 37 includes at least five primary tables that contain data usage tracking information, such as tables of data for: historical activity of data usage, deltas for category activity of data usage, deltas for application activity of data usage, totals for category activity and totals for application activity of data usage. In the example, "category" includes a point-to-point interface, packet data protocol interface, WiFi and other interfaces of the mobile station 13. Further, the database 37 contains procedures that enable quick and safe retrieval of data stored and guarded transactions. For example, the database 37 includes procedures for safe storage of data usage information, safe update and total of data usage amounts in each category. The database 37 also includes procedures for reconciling the database 37 after the synchronization with the network and procedures for recovery when data corruption or device failure occurs.

Also, when the tables of data of DataMeterDataStore 37 are updated, NetManager 35 deletes deltas (or delta values) stored in DataMeterDataStore 37 with the same category as indicated in update messages from the middleware server 21 (or notification messages from the real-time reporting platform 22) containing timestamps of the received data. In the example, the timestamps can be Unix timestamps of the local time when a data usage event is recorded on a network. More specifically, by way of example, when data usage by the mobile station is recorded by a server on the network at 7 p.m. Coordinated Universal Time (UTC) on Nov. 11, 2011, the local time is converted to a long integer value of "1321038000" in Unix timestamps format by the server on the network. The Unix timestamps is a way to track time as a running total of seconds starting at the Unix Epoch on Jan. 1, 1970. NetManager 35 calculates the sum of all deltas of the category activities and updates the sums in the totals for category table (e.g., totals for category activity and totals for application activity of data usage) in DataMeterDataStore 37.

Also, NetManager 35 stores or retrieves data usage information from DataMeterDataStore 37. For example, when the data meter client 33 periodically monitors data usage on the mobile station 13 at a set time interval, NetManager 35 stores the monitored data usage amount into DataMeterDataStore 37. Alternately, when the data meter client 33 performs synchronization with the network (e.g., a server or real-time reporting platform on a network) and reconciles information stored in DataMeterDataStore 37 at a specific time, DataMeterDataStore 37 removes or deletes all deltas or records prior to the specific time in DataMeterDataStore 37, then storing real-time data usage information obtained from the server (e.g. real-time reporting platform) in DataMeterDataStore 37. The sums of deltas are then updated in the tables (e.g., totals for category activity and totals for application activity of data usage) of DataMeterDataStore 37.

Widget UI 39 is a widget user interface (UI) program for displaying data usage information to the user of the mobile station 13. Widget UI 39 configures the mobile station 13 to display the data usage information with a date stamp on a home screen of the user's mobile station 13. When the user selects Widget UI 39 on the home screen of the user's mobile station 13, the data meter client 33 starts a graphical user interface for displaying various pieces of information including present data usage, navigation options pages or links to web pages where the user can get more detailed data usage information and make desired changes to the user's data plan (or user's total data usage allowance), and user preferences for electronic notifications of data usage when one or more threshold values for data usage (set by either the user or carrier) are exceeded on a network.

NetMeterReceiver 41 is a component that is responsible for monitoring radio and application usage of data communication service over the mobile communication network 15. NetMeterReceiver 41 uses a special file (e.g., the /proc/self/net/dev.txt file of the Linux Kernel) to determine usage of data communication services by the mobile station 13. The file contains information on an amount of data received and/or transmitted through one or more logical network interfaces registered with the operating system of the mobile station 13. In the example, the logical network interfaces include cellular interfaces, such as a point-to-point interface (e.g., ppp), a packet data protocol interface (e.g., pdp), WiFi and other interfaces (e.g., ti wlan for Texas Instrument wireless local area network (LAN), eth for Ethernet, wlan for wireless LAN, and athwlan for Atheros wireless LAN). NetMeterReceiver 41 stores and provides mobile station's data usage metering information to NetManager 35 such that NetManager 35 performs various functions relating to category activity of data usage and application activity of data usage. For example, as for the category activity of data usage, NetManager 35 takes inputs for a total amount of data activity that has occurred since the last update and calculate a delta (e.g., a difference between the total amount of current data activity and the previous total amount of data activity when the last update with the network was performed) based on timestamps and category history information. NetManager 35 updates various tables of data in DataMeterDataStore 37 and updates data usage information displayed by Widget UI 39, if needed. Alternately, instead of NetManager 35, other components of the data meter client 33 (e.g., NetMeterReceiver 41 or the like) can perform the data usage related functions.

DataMeterReceiver 43 is a component that initializes the data meter client 33 for its startup. In the example, DataMeterReceiver 43 sends an initialization request to NetManager 35 to start the operation of the data meter client 33. The data meter client 33 also includes SyncManager 45 that acts as an interface between the data meter client 33 and the middleware server 21. SyncManager 45 sends a request for real-time data usage information (e.g., current or billable data usage of data communication services by the mobile station 13) to the middleware server 21, and receives a response containing the requested information from the middleware server 21 over the mobile communication network 15. Within the data meter client 33, SyncManager 45 also communicates with NetManager 35 via network data usage sync request and response messages. For example, after receiving the requested information on the current data usage information from the middleware server 21 over the mobile communication network 15, SyncManager 45 sends the received current data usage information to NetManager 35 via a network data usage sync response message. Similarly, when NetManager 35 requests current data usage information available from the network, NetManager 35 sends to SyncManager 45 a network data usage sync request message to obtain the current data usage information from the real-time reporting platform 22 on the mobile communication network 15.

Figure 4:
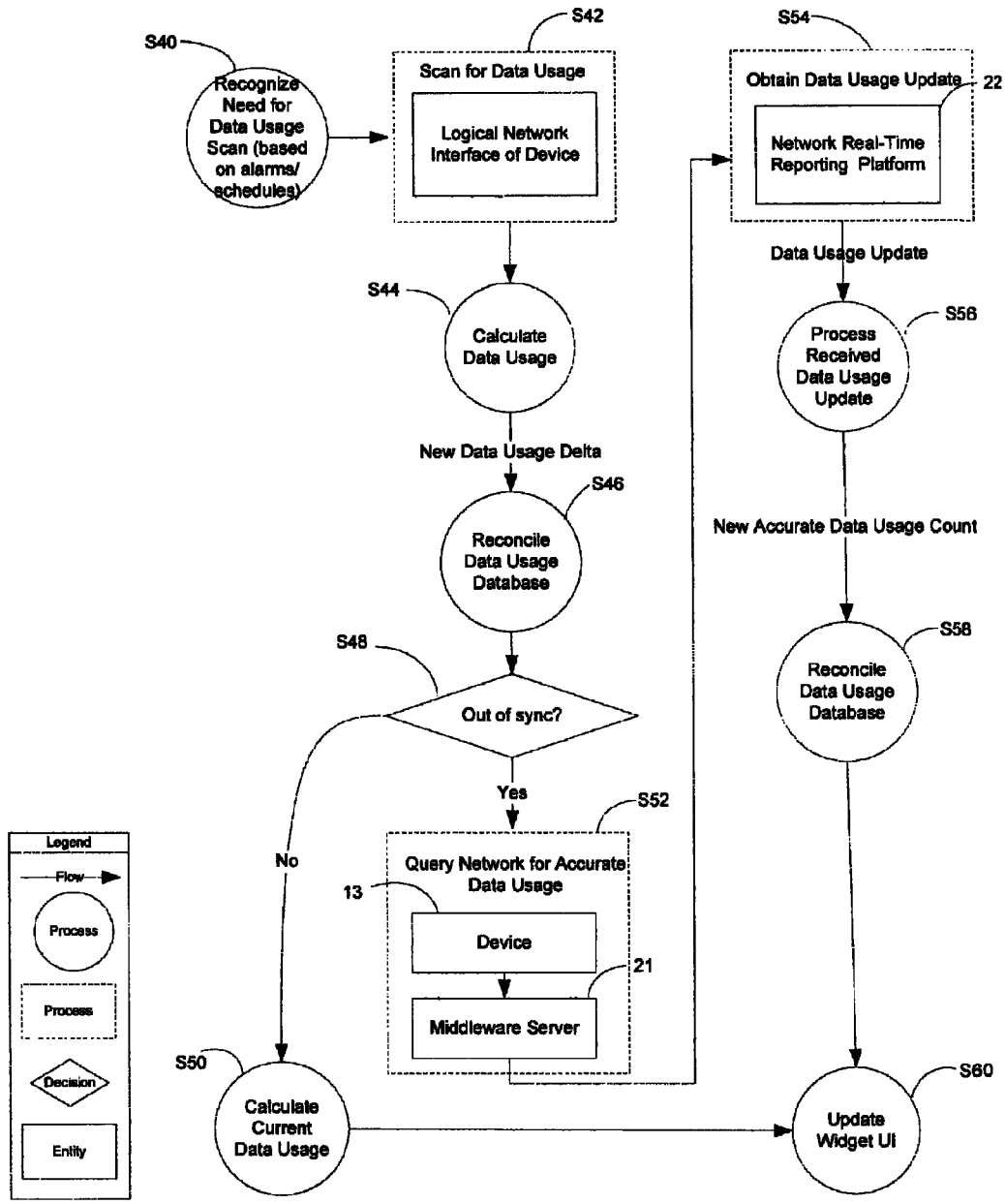
FIG. 4 illustrates a high level flow diagram for an exemplary process for updating data usage information based on data usage scanning and reconciliation of the mobile station.
Figure 5:
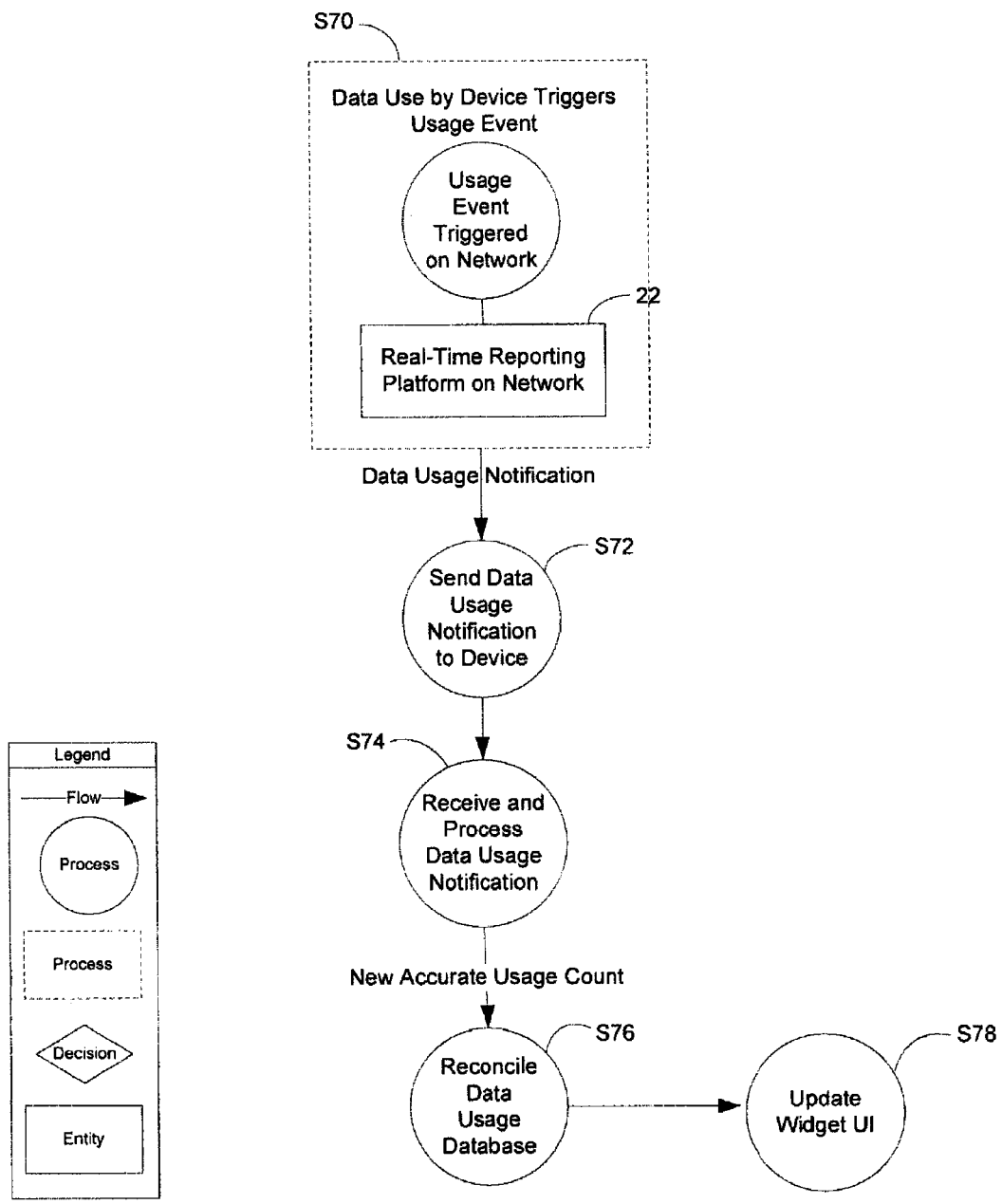
FIG. 5 illustrates a high level flow diagram for an exemplary process for updating data usage information based on a data usage notification from a network triggered by user data usage.
Figure 6:
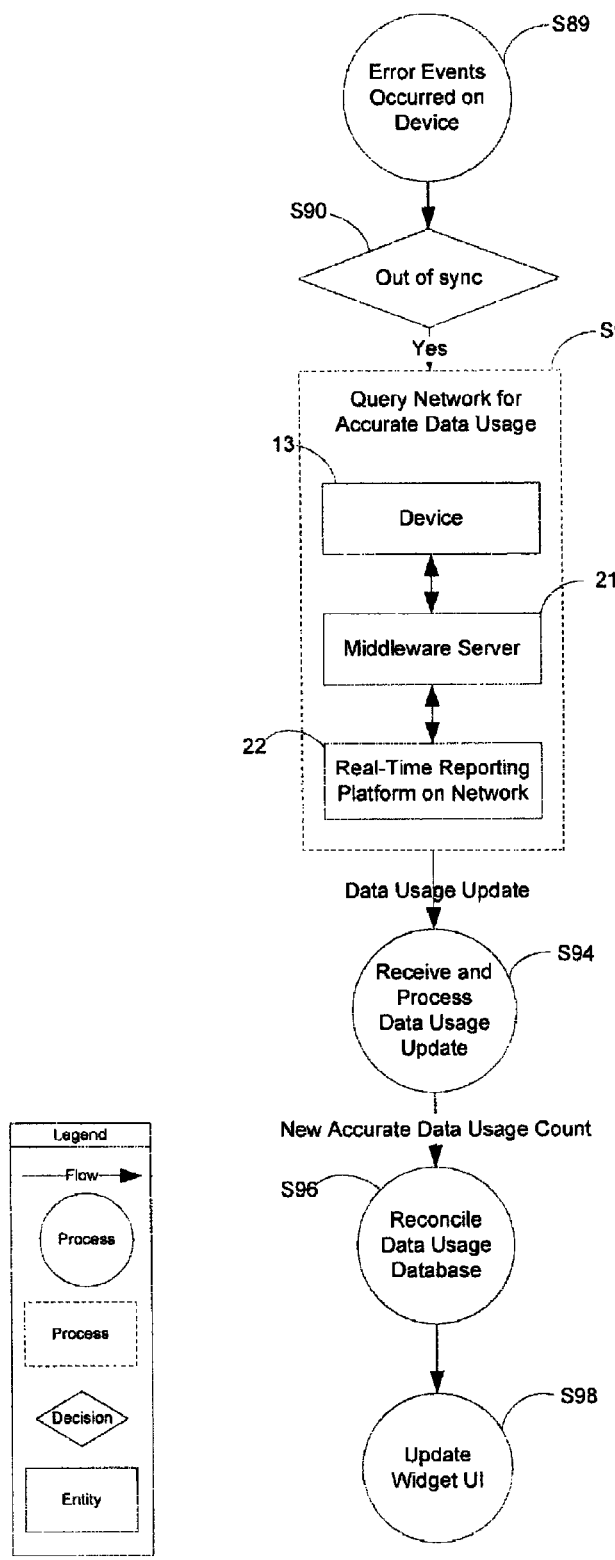
FIG. 6 illustrates a high level flow diagram for an exemplary process for updating data usage information based on error events on the mobile station.

FIGS. 4-6 illustrate exemplary processes of updating real-time data usage information on a mobile station, based on different triggering events, at a high level. FIG. 4 illustrates a simple flow diagram of an exemplary process for updating the real-time data usage information on the mobile station based on alarms or schedules set on the mobile station. FIG. 5 illustrates an exemplary process for updating the real-time data usage information on the mobile station 13 via data usage notifications triggered by data usage events on a network. FIG. 6 illustrates another exemplary process for updating real-time data usage information on the mobile station 13 because of error events occurred on the mobile station 13.

In the exemplary process of FIG. 4, the user can set an alarm or schedule an event on the mobile station 13 such that the data meter client 33 can scan and update the real-time data usage information on the mobile station 13. For example, based on the user's data allowance and rate of data usage, the user can schedule a scanning event for the data meter client 33 to monitor periodically (e.g., every 30 minutes) the real-time data usage by the mobile station 13. The data meter client 33 can monitor the real-time data usage at a predetermined interval ensuring maximum accuracy and minimum battery impact. Alternately, the user can be notified by an alarm at a predetermined interval for monitoring the real-time data usage via the data meter client 33. In the example, the period for alarms is predetermined (e.g., every 30 minutes) and set by the carrier, but can be changed by the user. However, when the period for alarms set by the user results in excessive battery consumption, the mobile station can alert the user and may suggest an alternate period for alarms under the operating conditions of the mobile station 13. By way of example, an alarm for monitoring the real-time data usage on the mobile station 13 can consume 4-5 milliamperes (mA) of the mobile station's battery. Thus, the occurrence of frequent alarms as set by the user of the mobile station 13 (e.g., alarms every 5 minutes) results in excessive battery consumption. In the example, the period for alarms is set to 30 minutes by the carrier so that the alarms for monitoring the real-time data usage on the mobile station 13 balance the demand for real-time monitoring without substantially adversely affecting the battery life.

In the exemplary process of FIG. 4, it is presumed that the mobile station 13 already obtained a prior amount of usage of data communication service through the mobile communication network 15 by the mobile station 13 from the network 15 (e.g., from a real-time reporting platform 22) and stored the prior amount of usage of data communication service in its local database 37. At S40, when an alarm or event scheduled for updating the real-time data usage information triggers, the data meter client 33 of the mobile station 13 recognizes the time has arrived for a data usage scan.

At S42, the data meter client 33 performs a scanning (or monitoring) operation to obtain an amount of data received or transmitted through logical network interface(s) of the mobile station 13 (e.g., an amount of data consumed by the mobile station 13). The scanning operation includes checking a file that contains logical interface names that are used for data transmit and receive from the mobile communication network 15. After checking the file, the data meter client 33 collects information on the logical interface names, and checks a device file in the mobile station 13 that contains cumulative data usage information per each logical interface used. For example, a "dev" file stored in a partition area, such as Linux partition, of the mobile station 13 keeps cumulative data usage information. From the dev file, the data meter client 33 reads and determines an amount of monitored data usage since the last scanning operation of the data usage (e.g., determines a delta value in the amount of data consumed since the last scan).

At S44, the data meter client 33 calculates an estimate amount of data usage based on the amount of monitored data usage since the last scanning operation through the logical network interface(s), and sets it as a new usage difference count (a "new usage delta count"). An estimate of current total usage of the data communication service through the communication network 15 by the mobile station 13 can be obtained by adding the monitored amount of the usage of the data communication service to the prior amount of usage of the data communication service stored in the database 37.

At S46, the data usage information stored in the database 37 is "reconciled." The term "reconcile" is used herein to mean that internal tables of the database 37 (e.g., DataMeter-DataStore 37) are updated, based on the new usage delta count. The data meter client 33 retrieves the data usage information from the database 37 and determines at S48 whether the monitored amount of the usage of the data communication service or estimate of current total usage of the data communication service is out-of-sync. An instance of having data usage information being out-of-sync can be detected by determining whether the monitored amount of the usage of the data communication service by the mobile station 13 since the last scanning operation (or synchronization with the network) is outside a range of tolerance (or a prescribed accuracy level). In the example, the range of tolerance is set to 10% of the user's total data usage allowance. By way of example, it is presumed that the user has 100 MB (megabytes) of total data allowed under the user's plan and the range of tolerance is set to 10%. Thus, if the monitored amount of the usage of the data communication service on the mobile station 13 is greater than 10 MB, the data meter client 33 determines that the data usage information of the network is out-of-sync and starts a synchronization process with the network. In the example, the range of tolerance (e.g., 10%) is preset by carrier, but can be changed by the user. Alternately, by examining the passage of a predetermined amount of time or an increase in the estimate amount of data usage on the mobile station 13 by a predetermined amount since a prior amount of usage of the data communication service obtained from the network, the data meter client 33 can determine whether or not the monitored amount of the usage of the data communication service by the mobile station 13 (or the estimate of current total usage of the data communication service) is out-of-sync.

Further, an out-of-sync instance can occur or declared by the data meter client 33 under various conditions, requiring a data usage synchronization with the network. For example, an out-of-sync instance can occur when a subscriber identity module (SIM) of a customer (or a mobile subscriber) is transferred between mobile stations and there is data usage on the customer's account that is not produced from the mobile station where the data meter client 33 is installed. Alternately, an out-of-sync instance can occur if the data meter client 33 is not installed at the beginning of a subscriber's billing cycle and data usage has occurred on the mobile station prior to the start of data usage monitoring by the data meter client 33. Alternately, an out-of-sync instance can occur when there is device failure or when the mobile station counts data usage that is not billed. Alternately, an out-of-sync instance can occur when failures in network transmission or network level data compression occur and an amount of data usage monitored by the network can be more than or less than an amount of data usage monitored by the mobile station.

At S50, when it is determined that the monitored amount of the usage of the data communication service (or the estimate of current total usage of the data communication service) is not out-of-sync, the data meter client 33 sets the monitored amount of the usage of the data communication service as a current amount of usage of the data communication service through the mobile communication network 15 by the mobile station 13, and uses the estimate of current total usage of the data communication service as an estimate of a total amount of usage of data communication service by the mobile station 13 for presenting it to the user of the mobile station 13 via the widget UI (at S60).

At S52, however, when it is determined that the monitored amount of the usage of the data communication service (or the estimate of current total usage of the data communication service) is out-of-sync, the data meter client 33 starts its synchronization (sync-up) process with the network by sending a query message over the mobile communication network 15 to the middleware server 21 for obtaining a current estimate amount of usage of data communication service by the mobile station 13, as measured by the network, from the real-time reporting platform 22. After receiving the query message from the data meter client 33, the middleware server 21 sends a data usage update request to the real-time reporting platform 22 for the current estimate amount of usage of data communication service by the mobile station 13. This can be characterized as a "data pull" performed by the mobile station 13 to obtain the most valid estimate of billable data usage amount from the network (e.g., from the real-time reporting platform 22).

In the example, the current estimate amount of usage of the data communication service by the mobile station 13, as measured in the network, is retrieved from the real-time reporting platform 22. The real-time reporting platform 22 includes a database (not shown) containing billable estimates of data usage information for mobile stations. Alternately, the real-time reporting platform 22 can obtain the current estimate amount of usage of the data communication service from a separate server containing billable estimates of data usage by the mobile stations. Responsive to the data usage update request, the real-time reporting platform 22 sends a data usage update response to the middleware server 21. The data usage update response includes the current estimate amount of usage of the data communication service by the mobile station 13. After receiving the data usage update response, the middleware server 21 sends to the mobile station 13 a server response message including the requested current estimate amount of usage of the data communication service by the mobile station 13 as measured in the network.

At S54, the middleware server 21 receives the current estimate amount of usage of data communication service by the mobile station 13 from the real-time reporting platform 22, as measured in the network. The middleware server 21 sends the server response message to the mobile station 13 containing the current estimate amount of usage of data communication service by the mobile station 13. As a result, the mobile station 13 (e.g., SyncManager 45 of the data meter client 33) receives the server response message from the middleware server 21, over the mobile communication network 15, in response to its previous query for further processing. For example, SyncManager 45 receives the server response message from the middleware server 21 over the mobile communication network 15 and forwards it to NetManager 35 for reconciling its local database 37 and displaying updated data usage information to the user.

At S56, the data meter client 33 processes the received server response message, setting the current estimate amount of usage of data communication service by the mobile station 13 as measured in the network as a "new accurate data usage count." At S58, the data meter client 33 reconciles with its local database 37 by updating the internal tables of the database 37 (e.g., DataMeterDataStore 37), based on the new accurate data usage count. At S60, the data meter client 33 updates, based on the new accurate data usage count, current data usage information displayed by the widget UI for presenting it to the user of the mobile station 13.

As discussed above, the real-time data usage information on the mobile station 13 can be updated via an alarm or event scheduled on the mobile station 13. In addition, the real-time data usage information on the mobile station 13 can be updated via data usage notifications from the network as illustrated in FIG. 5. FIG. 5 illustrates a simple flow diagram for an exemplary process for updating the real-time data usage information on the mobile station 13 via data usage notifications based on data usage events triggered on a network. That is, based on triggering events on the network (e.g., the real-time reporting platform 22 detects certain triggering events), the real-time reporting platform 22 can generate and send data usage notifications to update the real-time data usage information on the mobile station 13. The triggering events include data usage resets, thresholds for data usage being reached or exceeded, etc. As illustrated in FIG. 5, when the real-time reporting platform 22 detects one of the triggering events occurring on the network, at S70, the real-time reporting platform 22 sends (at S72) a data usage notification to the mobile station 13 over the mobile communication network 15. That is, by way of example, when a threshold value (e.g., 80% of data usage allowance under the user's plan) for usage of data communication service by the mobile station 13 is exceeded (e.g., the user's data usage exceeds the threshold value for data usage because of the user's viewing a movie on the mobile station 13 through a network connection), based on the total data usage amount by the mobile station 13 as measured by the network, the real-time reporting platform 22 sends a data usage notification to the mobile station 13 over the mobile communication network 15. As a result, based on the received data usage notification and current estimate of usage of data communication service by the mobile station 13 as measured in the network, the data meter client 33 of the mobile station 13 reconciles its local database 37 and updates the data usage information displayed by the widget UI on the mobile station 13. The user can view the current estimate of usage of data communication service by the mobile station 13 and take appropriate action, as desired. The threshold value for sending a data usage notification to the mobile station 13, based on the total usage amount of the data communication service by the mobile station 13, can be set by the carrier or the user of the mobile station 13. Alternately, the data usage notification can be sent to the mobile station 13 when a data communication session ends or when data usage by the mobile station 13 is reset at the end of a billing cycle and at the beginning of a new billing cycle. Also, the data usage notifications can be sent to the mobile station 13 using various technologies. For example, a data usage notification can be sent by the real-time reporting platform 22 as a short messaging service (SMS) message over the mobile communication network 15 or real-time data push over a packet connection with the mobile station 13. Alternately, a data usage notification can be sent over a packet connection to the mobile station 13 over the mobile communication network 15.

In the example, at S74, the mobile station 13 receives the data usage notification over the mobile communication network 15 as an SMS message and processes information contained in the SMS message. The data usage notification includes a current estimate amount of usage of data communication service through the mobile communication 15 by the mobile station 13, and exact time and date of data usage measurement (e.g., "timestamps" of data usage measurement) by the real-time reporting platform 22. The data meter client 33 (e.g., NetManager 35) receives the data usage notification and parses the information received, retrieving the current estimate amount of usage of data communication service by the mobile station 13 and setting it as a new accurate data usage count. At S76, based on the new accurate data usage count (as measured by the real-time reporting platform 22), the data meter client 33 reconciles with the database 37 (e.g., DataMeterDataStore 37) by updating the internal tables of the database 37. At S78, the data meter client 33 updates real-time data usage information displayed by the widget UI for presenting the updated data usage information to the user of the mobile station 13.

FIG. 6 illustrates another simple flow diagram of an exemplary process for updating real-time data usage information on the mobile station 13 due to error events that have occurred on the mobile station 13. That is, when the error events occur on the mobile station 13, the data meter client 33 starts a process of updating the real-time data usage information on the mobile station 13, as illustrated in FIG. 6. By way of example, the error events include swapping a Subscriber Identity Module (SIM) card on the mobile station 13, having an application reset, a database clear-out, or corruption due to hardware issues, passing a data usage tolerance level, powering on and off after a period of time (e.g., a couple of days), etc. These error events trigger updating the real-time usage of the data communication service on the mobile station 13.

In the example, at S89, when one of the error events has occurred, the data meter client 33 declares an out-of-sync state and begins its re-synchronization (re-sync) process as depicted in FIG. 6. More specifically, at S90, when the out-of-sync state is determined by the data meter client 33 on the mobile station 13 because of the one of the error events occurred on the mobile station 13, the data meter client 33 sends a query (at S92) to the middleware server 21 (e.g., SyncManager 45 sends a server request message to the middleware server 21) over the mobile communication network 15 to obtain a current estimate amount of usage of data communication service over the mobile communication network 15 by the mobile station 13 from the real-time reporting platform 22. In turn, the middleware server 21 sends a data usage update request to the real-time reporting platform 22 for obtaining the current estimate amount of usage of data communication service by the mobile station 13. In response to the data usage update request from the middleware server 21, the real-time reporting platform 22 obtains and sends the current estimate amount of usage of data communication service by the mobile station 13 via a data usage update response to the middleware server 21. After receiving the data usage update response from the real-time reporting platform 22, the middleware server 21 sends to the data meter client 33 over the mobile communication network 15 a server response, responsive to the query, wherein the server response includes the current estimate amount of usage of data communication service by the mobile station 13, as measured by the real-time reporting platform 22.

At S94, the data meter client 33 processes the received current estimate amount of usage of data communication service by the mobile station 13 into a "new accurate data usage count." At S96, the data meter client 33 reconciles with information stored in its local database 37 (e.g., DataMeter-DataStore 37) of the data meter client 33 by updating the internal tables of the local database 37 based on the received new accurate data usage count. At S98, based on the new accurate data usage count, the data meter client 33 updates data usage information displayed by the widget UI for presenting it to the user of the mobile station 13.

It should be appreciated that exemplary processes or methods depicted in FIGS. 4-6 can be implemented in various combinations to provide the mobile station 13 with a current estimate amount of usage of data communication service by the mobile station 13 during its operation. Various hybrid implementations can be utilized to provide near real-time data usage information on the mobile station 13 conserving the battery life. The conservation of the battery life is possible because the mobile station 13 makes a data call connection to the network to obtain the real-time data usage information from the real-time reporting platform only when an instance of out-of-sync is detected by the data meter client 33. For example, in one implementation intelligence of the data meter client 33 (e.g., logic to detect an out-of-sync state with respect to data usage information on the mobile station 13) is combined with communication with the real-time reporting platform 22, via the middleware server 21, to update the real-time data usage information on the mobile station 13. Alternately, in another implementation, the intelligence of data meter client 33 can be combined with communication with the real-time reporting platform 22 as well as notifications from the network to provide the user of the mobile station 13 with billable, real-time data usage information on the mobile station 13, as measured in the network, only when the update is needed, thereby conserving the battery life.

The structure, programming and operations of the various types of mobile stations are well known. However, for completeness, it may be useful to consider the functional elements/aspects of two exemplary mobile stations 13*a* and 13*b*, at a high level.

Figure 7A:
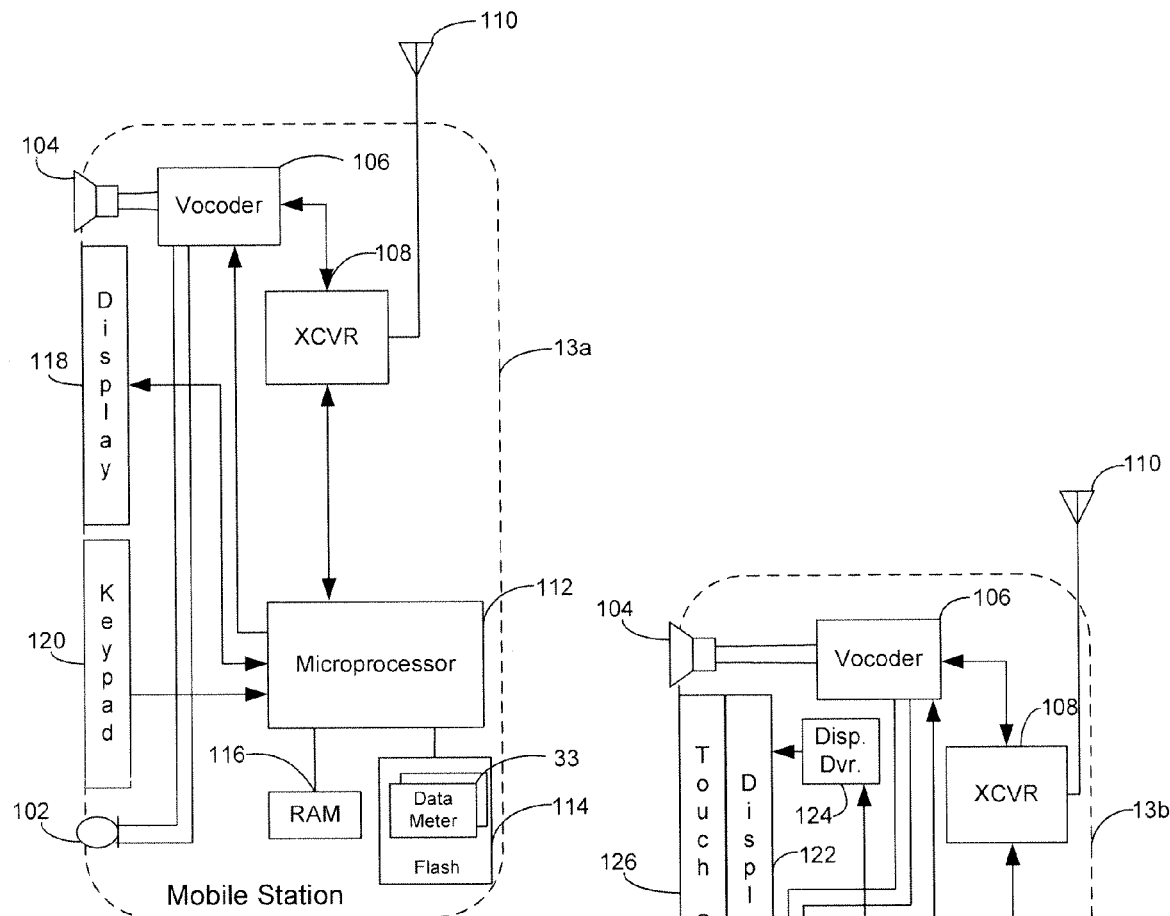
FIG. 7A is a high-level functional block diagram of an exemplary non-touch type mobile station that may utilize disclosed techniques through a network/system like that shown in FIG. 2.
Figure 7B:
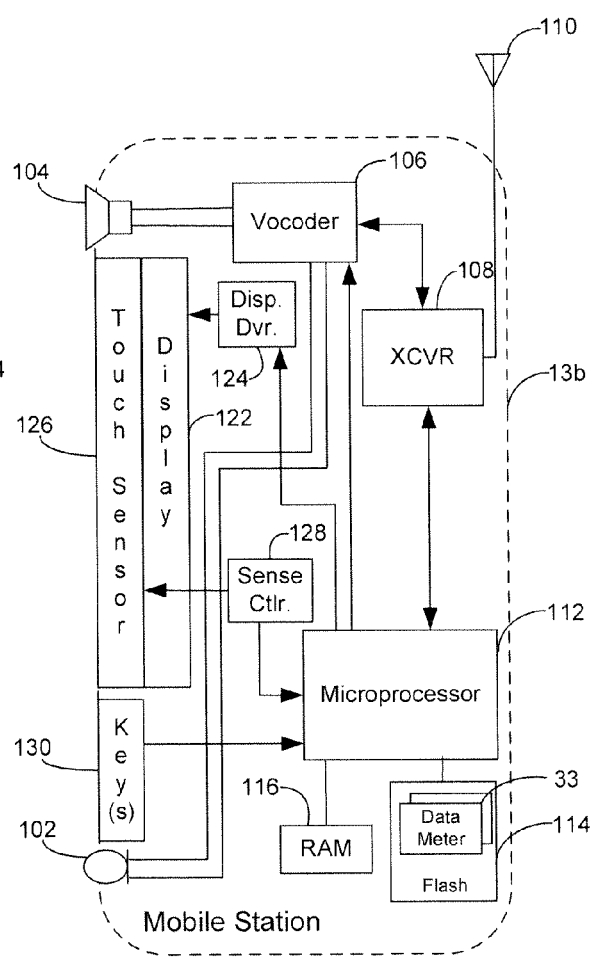
FIG. 7B is a high-level functional block diagram of an exemplary touch screen type mobile station that may utilize disclosed techniques through a network/system like that shown in FIG. 2.

For purposes of such a discussion, FIGS. 7A and 7B provide block diagram illustrations of an exemplary non-touch type mobile station 13*a*, exemplary touchscreen type mobile station 13*b*. For discussion purposes, the illustrations shows the mobile stations 13*a* and 13*b* are in the form of handsets. The exemplary handsets may be smart-phones or may be feature phones allowing at least some data communication capability.

The handset embodiment of the mobile station 13*a* functions as a normal digital wireless telephone station. For that function, the mobile station includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13*a* also includes at least one digital transceiver (XCVR) 108. Today, the handset 13*a* would be configured for digital wireless communications using one or more of the common network technology types. The concepts discussed here encompass embodiments of the mobile station 13*a* utilizing any digital transceivers that conform to current or future developed digital wireless communication standards. The mobile station 13*a* may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*a* and the communication network. Each transceiver 108 connects through RF send and receive amplifiers (not separately shown) to an antenna 110. The transceiver may also support various types of mobile messaging services (e.g., short message service (SMS)) and data services.

The mobile station 13*a* includes a display 118 for displaying messages, menus or the like, call related information dialed by the user, calling party numbers, etc., including data usage information for various data communications service over the mobile communication network. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) and data communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections related to data usage metering.

A microprocessor 112 serves as a programmable controller for the mobile station 13*a*, in that it controls all operations of the mobile station 13*a* in accord with programming that it executes, for all normal operations, and for operations involved in obtaining accurate information relating to usage of data communication service over the mobile communication by the mobile station under consideration here. In the example, the mobile station 13*a* includes flash type program memory 114, for storage of various "software" or "firmware" program routines and mobile configuration settings, such as mobile directory number (MDN) and/or mobile identification number (MIN), etc. The mobile station 13*a* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software, short message service software, and data meter client 33.

As noted earlier, the data meter client 33 configures the mobile station 13*a* to perform various functions including real-time data usage metering functions disclosed herein. By way of example, the data meter client 33, via the real-time data usage metering functions, communicates through a mobile communication network 15 from the mobile station 13*a* to obtain information indicating a prior amount of usage of data communication service through the mobile communication network 15 by the mobile station 13a, from a real-time reporting platform 22 on the mobile communication network 15. The data meter client 33, via the real-time data usage metering functions, monitors subsequent usage of the data communication service through one or more network interfaces in the mobile station 13a to determine a monitored amount of subsequent usage of data communication service through the mobile communication network 15 by one or more applications running in the mobile station 13a. Also, the monitored amount of subsequent usage is added to the prior amount of usage by the data meter client 33 to obtain an estimate of current total usage of the data communication service through the mobile communication network 15 by the mobile station 13a. The data meter client 33, via the real-time data usage metering functions, presents an indication of usage of the data communication service, based on the estimate of current total usage, to a user of the mobile station 13a.

Further, via the real-time data usage metering functions, the data meter client 33 detects occurrence of a condition indicating possible out-of-sync with respect to the estimate of current total usage of data communication service through the mobile communication network 15 by the mobile station 13a. Responsive to the detected occurrence of the condition, the data meter client 33 communicates through the mobile communication network 15 from the mobile station 13a to obtain information indicating a current estimate amount of usage of data communication service through the mobile communication network 15 by the mobile station 13a, from the real-time reporting platform 22 on the mobile communication network 15. The data meter client 33, via the real-time data usage metering functions, reconciles the estimate of current total usage of data communication service based on the information obtained from the real-time reporting platform 22. The obtained information indicates the current estimate amount of usage of data communication service through the mobile communication network 15 by the mobile station 13a. The data meter client 33, via the real-time data usage metering functions, presents an indication of usage of the data communication service, based on the reconciled estimate, to the user of the mobile station 13a.

The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for obtaining and updating real-time data usage of data communication service over the mobile communication network by the mobile station.

FIG. 7B provides a block diagram illustration of an exemplary touch screen type mobile station 13b. Although possibly configured somewhat differently, at least logically, a number of the elements of the exemplary touch screen type mobile station 13b are similar to the elements of mobile station 13a, and are identified by like reference numbers in FIG. 7A. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver.

As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the mobile communication network 15. Each transceiver 108 connects through RF send and receive amplifiers (not separately shown) to an antenna 110. The transceiver 108 may also support various types of mobile messaging services.

As in the example of station 13a, a microprocessor 112 serves as a programmable controller for the mobile station 13b, in that it controls all operations of the mobile station 13b in accord with programming that it executes, for all normal operations, and for operations involved in the procedure of obtaining and updating real-time data usage by the mobile station 13b under consideration herein. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming including the data meter client 33. The programming stored in the flash memory 114 configures the processor of the mobile station to perform various desired functions, including in this case the functions involved in obtaining and updating the real-time data usage by the mobile station 13b from a network element, such as a real-time reporting platform 22.

The data meter client 33 is an application program running in the mobile station 13b and performs various functions in support of real-time data usage metering on the mobile station 13b. As noted earlier, the data meter client 33 performs real-time data usage metering functions. The mobile station 13b communicates, via the real-time data usage metering functions, through a mobile communication network 15 to obtain information indicating a prior amount of usage of data communication service through the mobile communication network 15 by the mobile station 13b, from a real-time reporting platform 22 on the mobile communication network 15. The data meter client 33, via the real-time data usage metering functions, monitors subsequent usage of the data communication service through one or more network interfaces in the mobile station 13b to determine a monitored amount of subsequent usage of data communication service through the mobile communication network 15 by one or more applications running in the mobile station 13b. The monitored amount of subsequent usage is added to the prior amount of usage to obtain an estimate of current total usage of the data communication service through the mobile communication network 15 by the mobile station 13b. The data meter client 33 presents an indication of usage of the data communication service, based on the estimate of current total usage, via the real-time data usage metering functions, to a user of the mobile station 13b.

Further, the data meter client 33, via the real-time data usage metering functions, determines whether or not the estimate of current total usage of data communication service through the mobile communication network 15 by the mobile station 13b is out-of-sync. When it is determined that the estimate of current total usage of data communication service through the mobile communication network 15 by the mobile station 13b is out-of-sync, the data meter client 33 communicates, via the real-time data usage metering functions, through the mobile communication network 15 from the mobile station 13b to obtain information indicating a current estimate amount of usage of data communication service through the mobile communication network 15 by the mobile station 13b, from the real-time reporting platform 22 on the mobile communication network 15. The data meter client 33 further reconciles the estimate of current total usage of data communication service based on the information obtained from the real-time reporting platform 22. The obtained information indicates the current estimate amount of usage of data communication service through the mobile communication network 15 by the mobile station 13b. The data meter client 33, via the real-time data usage metering functions, presents an indication of usage of the data communication service, based on the reconciled estimate, to the user of the mobile station 13b.

In the example of FIG. 7A, the user interface elements included a display and a keypad. The mobile station 13b may have a limited number of keys 130, but the user interface functions of the display and keypad are replaced by a touch-screen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output.

The structure and operation of the mobile stations 13a and 13b, as outlined above, were described to by way of example, only.

As shown by the earlier discussion, functions relating to providing information relating to estimated current data usage of the data communications service by the mobile station may be implemented on computers connected for data communication via the components of a packet data network, operating as an real-time data reporting server and/or as a middleware server as shown in FIG. 2 in communication with each other and/or with the mobile station. Although special purpose devices may be used, such devices also may be implemented using one or more hardware platforms intended to represent a general class of data processing device commonly used to run "server" programming so as to implement the billable data usage related functions discussed above, albeit with an appropriate network connection for data communication.

The software functionalities involve programming, including executable code as well as associated stored data, e.g. files used for the widget UI and data meter client. The software code is executable by the general-purpose computer that functions as the real-time data reporting or middleware server and/or the processor of a mobile station. In operation, the code is stored within the general-purpose computer platform or mobile station. At other times, however, the software may be stored at other locations and/or transported for loading into the appropriate general-purpose computer system or mobile station. Execution of such code by a processor of the computer platform and/or mobile station enables the platform or mobile station to implement the methodology for obtaining and updating current estimate amount of usage of data communication service by the mobile station, in essentially the manner performed in the implementations discussed and illustrated herein.

Figure 8:
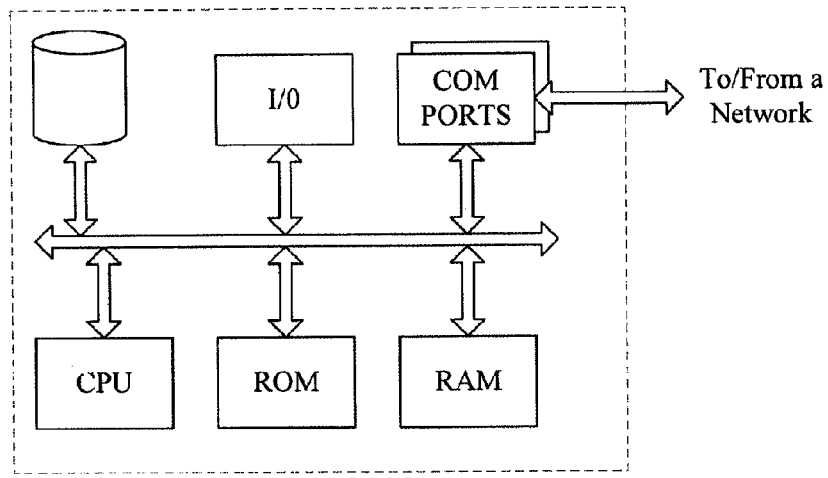
FIG. 8 is a simplified functional block diagram of a computer that may be configured as a host or server, for example, to function as a middleware server or real-time reporting platform in the system of FIG. 2.
Figure 9:
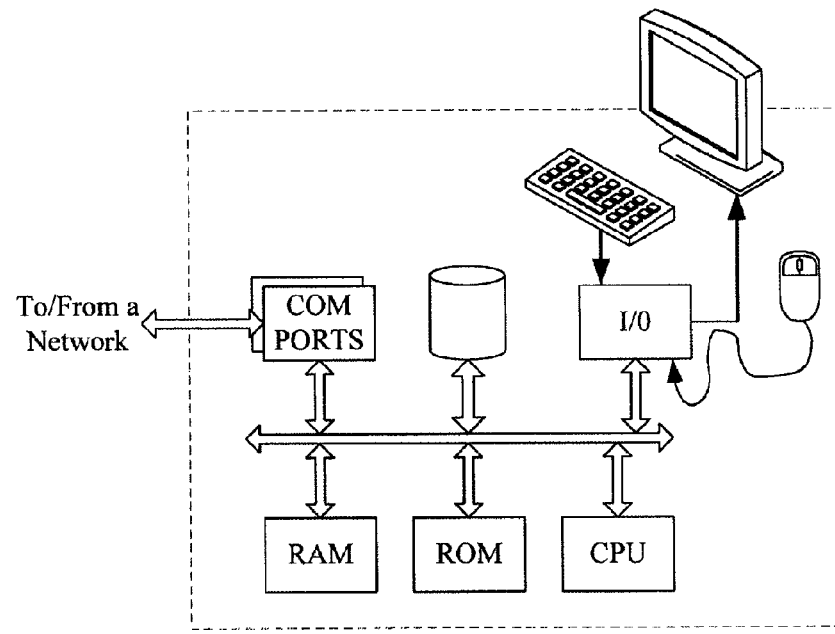
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that the structure, programming and general operation of such computer equipment are well known and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and are well known. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile station type user terminal may include similar elements (compare to FIGS. 7A and 7B), but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. It is presumed that the hardware elements, operating systems and programming languages of such user terminal devices also are conventional in nature and are well known.

Hence, aspects of the methods of obtaining and updating usage information of data communication service over the mobile communication network by a mobile station outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the carrier into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the techniques for providing and updating real-time data usage of data communication service by the mobile station, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising steps of:
communicating through a mobile communication network from a mobile station to obtain information indicating a prior amount of usage of data communication service through the mobile communication network by the mobile station, from a real-time reporting platform on the mobile communication network;
on the mobile station, monitoring subsequent usage of the data communication service through one or more network interfaces in the mobile station to determine a monitored amount of subsequent usage of the data com- munication service through the mobile communication network by one or more applications running in the mobile station;

adding the monitored amount of the subsequent usage of data communication service to the prior amount of usage of the data communication service to obtain an estimate of current total usage of the data communication service through the mobile communication network;

monitoring to determine whether or not the estimate of current total usage of data communication service through the mobile communication network is out-of-sync;

when, based on the monitoring, it is determined that the estimate of current total usage of data communication service through the mobile communication network is not out-of-sync, presenting an indication of usage of the data communication service, based on the estimate of current total usage, to the user of the mobile station; and when, based on the monitoring, it is determined that the estimate of current total usage of data communication service through the mobile communication network is out-of-sync:

communicating through the mobile communication network from the mobile station to obtain information indicating a current estimate amount of usage of data communication service through the mobile communication network by the mobile station, as measured in the mobile communication network, from the real-time reporting platform, reconciling the estimate of current total usage of the data communication service with the information indicating the current estimate amount of usage of the data communication service, and presenting an indication of usage of the data communication service by the mobile station, based on the reconciled estimate of current total usage, to the user of the mobile station.

2. The method of claim 1, wherein the step of monitoring to determine whether or not the estimate of current total usage of data communication service through the mobile communication network is out-of-sync comprises detecting occurrence of a possible out-of-sync state by a passage of a predetermined amount of time or an increase in the estimate of current total usage of data communication service through the mobile communication network by a predetermined amount since the prior amount of usage of the data communication service was obtained from the real-time reporting platform.

3. The method of claim 1, wherein the step of monitoring to determine whether or not the estimate of current total usage of data communication service through the mobile communication network is out-of-sync comprises detecting occurrence of a possible out-of-sync state by determining whether the monitored amount of the subsequent usage of data communication service is outside a range of tolerance.

4. The method of claim 1, further comprising:
receiving a data usage notification through the mobile communication network from the real-time reporting platform, wherein:
the data usage notification indicates occurrence of a predetermined event related to usage of data communication service by the mobile station as measured by the real-time reporting platform; and
the data usage notification includes the current estimate amount of usage of data communication service by the mobile station that has reached a threshold level.

5. The method of claim 4, wherein the threshold level is set by a user of the mobile station.

6. The method of claim 4, wherein the data usage notification is received by the mobile station via a short messaging service (SMS) message over the mobile communication network.

7. The method of claim 4, wherein the data usage notification is received over a packet connection through the mobile communication network.

8. The method of claim 1, wherein the step of communicating to obtain information about the prior amount of usage comprises:
sending a request to a middleware server on the mobile communication network for information about the prior amount of usage of data communication service through the mobile communication network by the mobile station; and
responsive to the request, receiving a response from the middleware server containing the requested information about the prior amount of usage of data communication service by the mobile station.

9. A data meter client executable by a processor of a mobile station and a non-transitory medium bearing the data meter client, wherein execution of the data meter client by the processor configures the mobile station to perform real-time data usage metering functions, including functions to:

communicate through a mobile communication network from the mobile station to obtain information indicating a prior amount of usage of data communication service through the mobile communication network by the mobile station, from a real-time reporting platform on the mobile communication network;

monitor subsequent usage of the data communication service through one or more network interfaces in the mobile station to determine a monitored amount of subsequent usage of data communication service through the mobile communication network by one or more applications running in the mobile station;

add the monitored amount of subsequent usage to the prior amount of usage to obtain an estimate of current total usage of the data communication service through the mobile communication network by the mobile station;

present an indication of usage of the data communication service, based on the estimate of current total usage, to a user of the mobile station;

determine whether or not the estimate of current total usage of data communication service through the mobile communication network by the mobile station is out-of-sync;

when it is determined that the estimate of current total usage of data communication service through the mobile communication network by the mobile station is out-of-sync, communicate through the mobile communication network from the mobile station to obtain information indicating a current estimate amount of usage of data communication service through the mobile communication network by the mobile station, from the real-time reporting platform on the mobile communication network;

reconcile the estimate of current total usage of data communication service with the information indicating the current estimate amount of usage of data communication service through the mobile communication network by the mobile station; and present an indication of usage of the data communication service, based on the reconciled estimate, to the user of the mobile station.

10. The data meter client of claim 9, wherein the real-time data usage metering functions to whether or not the estimate of current total usage of data communication service through the mobile communication network by the mobile station is out-of-sync include a function to detect a passage of a predetermined amount of time or an increase in the estimate of current usage of data communication service through the mobile communication network by a predetermined amount, since the prior amount of usage of data communication service was obtained from the real-time reporting platform.

11. The data meter client of claim 9, wherein the real-time data usage metering functions to whether or not the estimate of current total usage of data communication service through the mobile communication network by the mobile station is out-of-sync include a function to detect whether the monitored amount of the subsequent usage of data communication service is outside a range of tolerance.

12. The data meter client of claim 9, wherein execution of the data meter client by the processor of the mobile station further configures the mobile station to perform a function to:
  receive a data usage notification through the mobile communication network from the real-time reporting platform, wherein:
    the data usage notification indicates occurrence of a predetermined event related to the usage of data communication service by the mobile station as measured by the real-time reporting platform; and
    the data usage notification includes the current estimate amount of usage of data communication service that has reached a threshold level.

13. The data meter client of claim 12, wherein the predetermined event includes detecting a difference greater than or equal to a predetermined amount between the threshold level reached by the actual usage and the estimate of current total usage of data communication service through the mobile communication network by the mobile station.

14. A system comprising:
  a middleware server configured to communicate with a mobile station;
  a real-time reporting platform configured to provide a current estimate amount of usage of data communication service through a mobile communication network by a mobile station and to communicate with the middleware server,
  wherein:
    execution of a program by a processor of the middleware server configures the middleware server to perform functions, including functions to:
      receive a data usage request from the mobile station, over a mobile communication network, the data usage request requesting the current estimate amount of usage of data communication service through the mobile communication network by the mobile station, and
      responsive to the data usage request, send to the mobile station, over the mobile communication network, a data usage response including the current estimate amount of usage of data communication service by the mobile station; and
    execution of a program by a processor of the real-time reporting platform configures the real-time reporting platform to perform functions, including functions to:
      receive a data usage update request from the middleware server requesting information on a current estimate amount of usage of data communication service through the mobile communication network by the mobile station;
      responsive to the data usage update request, send to the middleware server a data usage update response including the requested information about the current estimate amount of usage of data communication service by the mobile station;
      detect occurrence of a predetermined event related to the usage of data communication service through the mobile communication network by the mobile station; and
      responsive to the detected occurrence of the predetermined event, send a data usage notification over the mobile communication network to the mobile station indicating that the current estimate amount of usage of data communication service by the mobile station has reached a threshold level;
    wherein execution of a program by a processor of the mobile station configures the mobile station to determine whether or not an estimate of current total usage of data communication service through the mobile communication network by the mobile station is out-of-sync.

15. The system of claim 14, wherein the data usage notification is sent to the mobile station via a short messaging service (SMS) message over the mobile communication network.

16. The system of claim 14, wherein the data usage notification is sent to the mobile station over a packet connection through the mobile communication network.

17. The system of claim 14, wherein the threshold level is set by a user of the mobile station.

* * * * *